April 14, 1925.   1,533,731
J. W. FOLEY
AUTO SHADE
Filed July 6, 1923   2 Sheets-Sheet 1
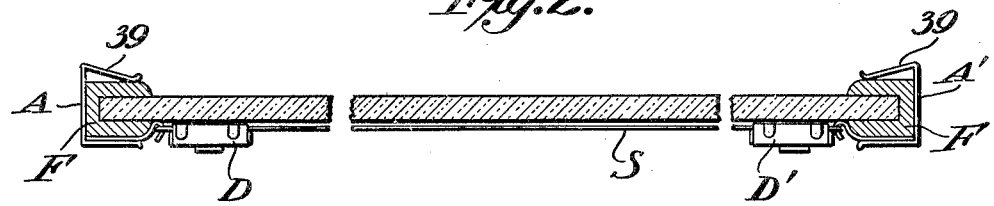
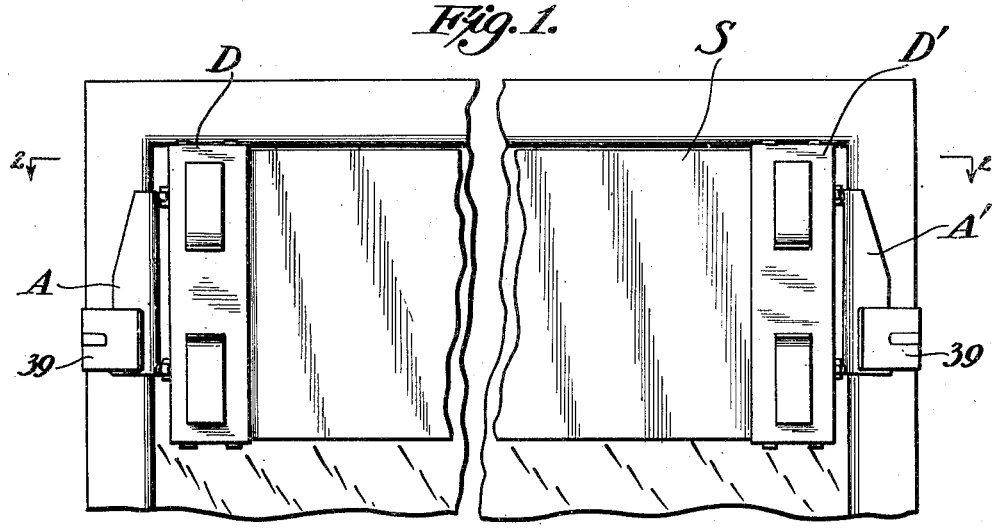
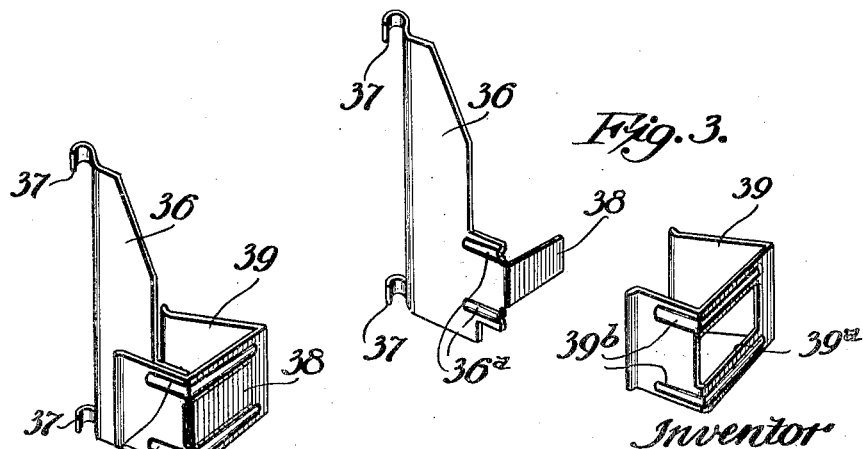
Inventor
J. W. Foley
by Hazard and Miller
Attys

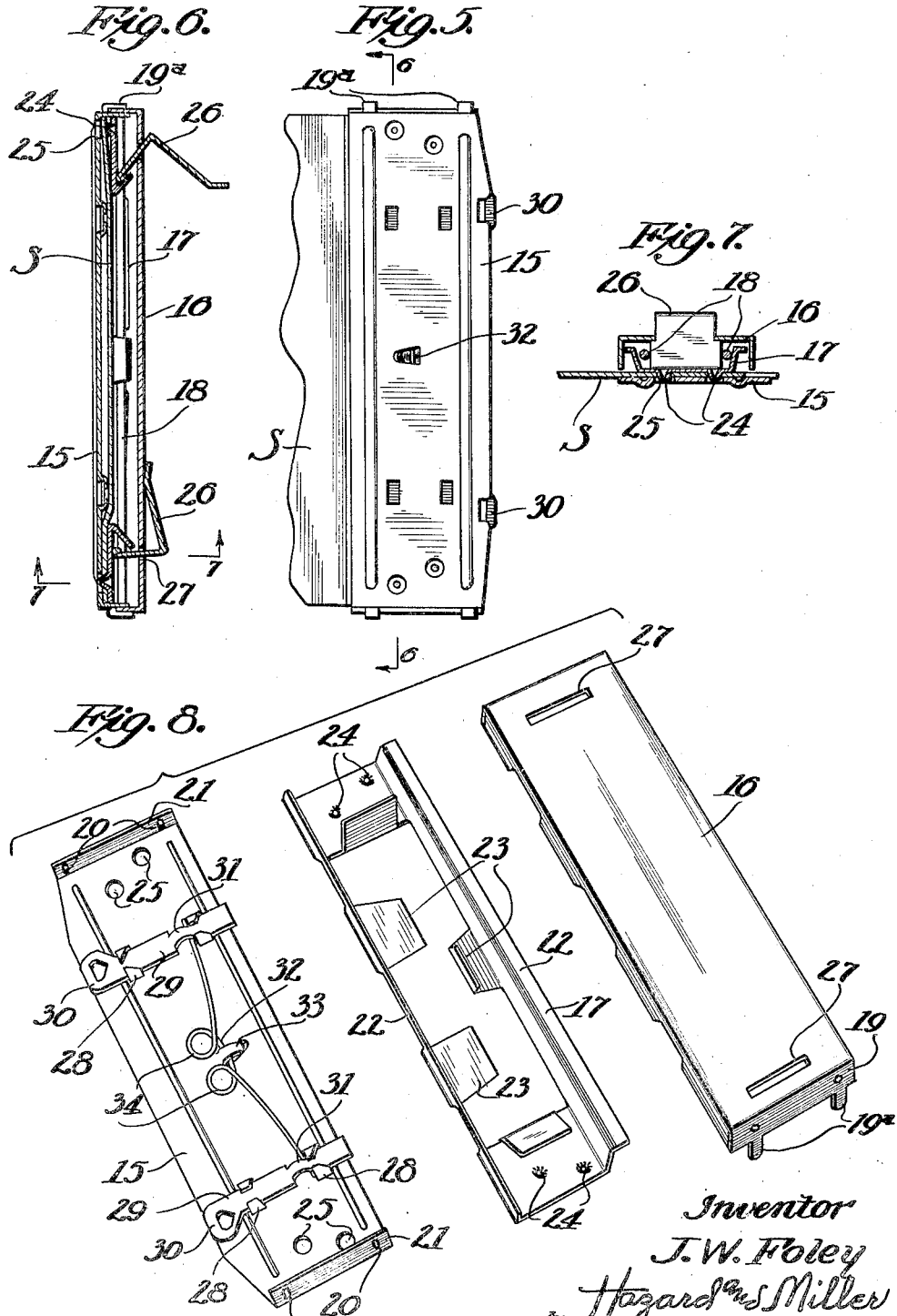

Patented Apr. 14, 1925.

1,533,731

UNITED STATES PATENT OFFICE.

JOSEPH W. FOLEY, OF LOS ANGELES, CALIFORNIA.

AUTO SHADE.

Application filed July 6, 1923. Serial No. 649,789.

*To all whom it may concern:*

Be it known that I, JOSEPH W. FOLEY, a citizen of the United States, residing at Los Angeles, in the county of Los Angeles and State of California, have invented new and useful Improvements in Auto Shades, of which the following is a specification.

My invention relates to light shades of screen for automobile wind shields, and it has particular reference to certain new and useful improvements in the supporting and attaching devices embodied in my co-pending application, Serial No. 586826, filed September 8th, 1922.

It is a purpose of my present invention to provide supporting and attaching means for a light screen which are of extremely simple, practical, and durable construction, and which serve to rigidly support the light screen adjustably and in fully extended position upon a wind shield.

Although I have herein shown and will describe only one form of supporting and attaching means for a light screen embodying my invention, it is to be understood that various changes and modifications may be made herein without departing from the spirit of the invention and the spirit and scope of the appended claims.

In the accompanying drawings,

Fig. 1 is a view showing in rear elevation a wind shield having applied thereto one form of supporting and attaching means embodying my invention.

Fig. 2 is a longitudinal sectional view taken on the line 2—2 of Fig. 1.

Figs. 3 and 4 are detailed perspective views showing one of the supporting devices shown in Fig. 1, Fig. 3 showing such device in disassembled position, and Fig. 4 showing the device in assembled position.

Fig. 5 is an enlarged view showing in front elevation one of the attaching devices shown in Fig. 1.

Fig. 6 is a vertical sectional view taken on the line 6—6 of Fig. 5.

Fig. 7 is a transverse sectional view taken on the line 7—7 of Fig. 6.

Fig. 8 are perspective views of the elements comprised in the attaching device shown in Fig. 5, such elements occupying their proper relative positions for assembling.

Similar reference characters refer to similar parts in each of the several views.

Referring specifically to the drawings and particularly to Figs. 1 and 2, I have here shown a light shade or screen which is in the form of a flexible and translucent strip of material designated at S, such strip being preferably formed of colored celluloid and adapted to be adjustably held in spanning relation to the upper portion of the wind shield frame F so as to intercept the vision of the driver.

The means for adjustably sustaining the strip S in spanning position with respect to the wind shield constitutes the subject matter of my present invention, and this means in the present instance comprises two attaching devices D and D' which engage the ends of the strip S, as clearly shown in Figs. 1 and 2, and two supporting devices A and A', the latter embracing the wind shield frame F and serving to support the attaching devices in vertical position upon the wind shield frame.

As the construction and operation of each attaching device is the same, a description of one will suffice for both. The attaching device D comprises, as clearly shown in Fig. 8, a pair of plates 15 and 16 between which are interposed a gripping and spacing plate 17, the latter plate co-operating with the plate 15 to effectively grip one end of the strip S. Plate 15 is adapted to be arranged within the area defined by the plate 16 and is movably associated therewith by means of rods 18 (Fig. 6) which extend through end flanges 19 of the plate 16 and through transverse slots 20 formed in the end flanges 21 of the plate 15. The ends of the rods 18 are permanently retained within the flanges 19 by bendable tongues 19ª, and the slots 20 are of a size to allow movement of the rods therein so that the plate 15 can move laterally with respect to the plate 16. The plate 17 is provided with side flanges 22, guiding lips 23, and projections 24 which are adapted to be interposed within the openings 25 of the plate 15 so as to grip the end of the strip and thereby securely hold the same against removal from the attaching device in the manner clearly shown in Fig. 7.

For moving and maintaining the gripping plate 17 in the position wherein the projections are within the openings 25, I provide a pair of clamping levers 26 (Fig. 6) which are extended through slots 27 of the plate 16 so that they are pivotally supported to occupy active and inactive positions. In the active position of the levers, as shown in the lower portion of Fig. 6, the plate 17 is moved in the direction of the plate 15 thereby forcing the projections 24 into the openings 25 and thus securely gripping the strip S. In the inactive position of the levers, as shown in the upper portion of Fig. 6, the projections 24 are removed from the openings 25 so as to allow the sliding of the strip S through the attaching device.

As shown in Fig. 8, the plate 15 is formed on its inner side with guide lips 28 between which are slidably mounted strips 29 provided at one end with eyes 30. Between their ends the strips 29 are formed with loops 31 which are engaged by the ends of a spring 32. This spring 32 is formed of a single length of resilient wire secured intermediate its ends by a lip 33 formed on the plate 15. The wire is bent adjacent its intermediate portion to form loops 34, with the ends of the wire extending tangentially from the loops to provide resilient arms which are normally urged to the position shown in Fig. 8. In this position of the arms the strips 29 are retracted, and it will be understood that when the strips are pulled outwardly the resilient arms will oppose such movement.

The two attaching devices D and D' are sustained in vertical position upon the wind shield frame F by means of the supporting devices A and A', and as the supporting devices are of the same construction, a description of one will suffice for both. As shown in Figs. 3 and 4, each supporting device includes a bracket 36, the transverse contour of which conforms to the shape of the rear side of the wind shield frame to which it is adapted to be applied. This bracket 36 is provided at its inner edge with hooks 37 adapted to engage within the eyes 30 of the strips 29. Adjacent the lower end of the bracket, a right angular extension 38 is formed which lies flat against the outer edge of the wind shield frame. In order to prevent vertical and horizontal movements of the bracket upon the wind shield; or in other words, to maintain the bracket in definite position upon the frame, a substantially U-shaped clamp 39 is arranged to embrace the bracket and the outer edge of the frame. This clamp 39 is formed of resilient metal so that when in applied position it is held under tension. The intermediate portion of the clamp is provided with an opening 39$^a$ which is adapted to receive the extension 38 in the manner clearly shown in Fig. 4, thereby holding the extension as well as the bracket against vertical and horizontal displacement upon the wind shield frame. Reinforcing and positioning ribs 36$^a$ and 39$^b$ are formed on the bracket and clamp, respectively, which serve to lock the clamp against vertical movement on the bracket, it being understood that the ribs 39$^b$ provide grooves on the inner side of the clamp which receive the ribs 36$^a$.

In the applied position of the supporting devices, as shown in Figs. 1 and 2, the hooks 37 are positioned to engage the eyes 30 of the strips 29 and thereby support the attaching devices in vertical position upon the wind shield frame. Before applying the attaching devices to the supporting devices, it is assumed that the strip S has been adjusted within the attaching device D to present a strip of the proper length for a particular wind shield and so that when the attaching devices are applied to the supporting devices the distance between the attaching devices will be slightly less than the distance between the supporting devices; consequently, when the attaching devices are applied to the hooks the strips 29 will be pulled outwardly against the tension of the springs 32 thereby exerting the necessary pull upon the attaching devices to maintain the strip S in fully extended position upon the wind shield.

With reference to Fig. 8, it will be noted that the lips 28 are arranged in spaced pairs, with the lips of the inner pair limiting the inward movement of the strips 29 under the action of the spring 32, and the outer pair limiting the outward pull upon the strips. This construction prevents the distortion of the spring and the accidental removal of the strips.

What I claim is:

1. An attaching device of the character described, comprising a pair of plates associated with each other to permit of limited lateral movement of one plate with respect to the other, a third plate interposed between the first two plates, coacting gripping means formed on one of the first plates and the intermediate plate, and levers carried by one of the first plates for moving the intermediate plate so as to cause said locking means to engage a shade strip.

2. In combination, a supporting device, comprising a bracket, hooks formed in the bracket, a clamping member for securing the bracket to the wind shield frame and an attaching device, comprising a pair of plates, a third plate movably interposed between the first two plates, gripping means on one of the first plates and the intermediate plate, manually operable lever means for moving the intermediate plate to render said gripping means active, strips slidably mounted on one of the plates and provided with eyes adapted to receive said hooks, and resilient means for urging the strips in one direction.

3. In an auto shade, an attaching device for gripping the end of a flexible strip of celluloid and comprising a pair of plates and a gripping plate interposed between the pair of plates, there being overlapping flanges at the ends of the pair of plates and rod openings through the flanges of one plate and slotted openings through the flanges of the other plate, rods inserted through the openings to connect the plates together and to allow of limited movement of the plates to and from each other, one of said pair of plates having guide lips at its inner side, strips slidingly mounted in the guide lips crosswise of the plate and having eyes at their outer ends and having loops intermediate of their ends, a spring mounted upon the plate and having ends engaging in the loops to press the strips in one direction and the plate having gripping means, the intermediate plate having side flanges and guiding lips and gripping means cooperating with the first gripping means, the second of the pair of plates having transverse slots, and levers mounted in the slots and engaging the intermediate plate for compressing the intermediate plate against the material to grip the material between the intermediate plate and the first plate.

4. An auto shade, comprising a strip of screen material such as celluloid, attaching devices connected to the ends of the sheet of material, and supporting devices adapted to be mounted upon the side bars of a windshield and having hooks projecting inwardly, the attaching device having strips yieldingly mounted with eyes at their outer ends to engage the hooks.

5. An auto shade, comprising a strip of screen material such as celluloid, attaching devices connected to the ends of the sheet of material, and supporting devices adapted to be mounted upon the side bars of a windshield and having hooks projecting inwardly, the attaching device having strips yieldingly mounted with eyes at their outer ends to engage the hooks, each supporting device comprising a bracket having a transverse contour conforming to the shape of the rear side of the windshield frame to which it to be applied, hooks extending inwardly from the inner edge of the bracket and engaging in the eyes of the attaching device, a right angular extension at the lower end of the bracket, and a U-shaped clamp of resilient material secured to the extension and adapted to snap upon the windshield frame to hold the bracket from moving upwardly or downwardly.

In testimony whereof I have signed my name to this specification.

JOSEPH W. FOLEY.